(12) United States Patent
Marriott et al.

(10) Patent No.: US 8,047,615 B2
(45) Date of Patent: Nov. 1, 2011

(54) SEAT BELT SYSTEM AND SEAT

(75) Inventors: Brandon Scott Marriott, Waterford, MI (US); Thomas Wayne Messner, Grand Blanc, MI (US); Paul Michael Smith, Davison, MI (US)

(73) Assignee: TK Holdings Inc., Auburn Hills, MI (US)

( * ) Notice: Subject to any disclaimer, the term of this patent is extended or adjusted under 35 U.S.C. 154(b) by 247 days.

(21) Appl. No.: 12/232,233

(22) Filed: Sep. 12, 2008

(65) Prior Publication Data

US 2009/0072608 A1 Mar. 19, 2009

Related U.S. Application Data

(60) Provisional application No. 60/960,154, filed on Sep. 18, 2007.

(51) Int. Cl.
*B60R 22/00* (2006.01)
(52) U.S. Cl. .................................. 297/481; 297/468
(58) Field of Classification Search .................. 297/468, 297/469, 481; 24/684
See application file for complete search history.

(56) References Cited

U.S. PATENT DOCUMENTS

| | | | | | |
|---|---|---|---|---|---|
| 2,964,100 | A | * | 12/1960 | McCall | 297/474 |
| 4,210,365 | A | * | 7/1980 | Breitschwerdt et al. | 297/481 |
| 4,560,203 | A | * | 12/1985 | Huber | 297/481 |
| 5,044,695 | A | * | 9/1991 | Tsuchiya | 297/481 |
| 5,332,261 | A | * | 7/1994 | Siepierski | 280/801.1 |
| 5,855,047 | A | * | 1/1999 | Haas | 24/684 |
| 2006/0255647 | A1 | * | 11/2006 | Hyatt et al. | 297/481 |

FOREIGN PATENT DOCUMENTS

| | | | |
|---|---|---|---|
| DE | 3509984 | * | 6/1986 |
| EP | 0051126 | * | 5/1982 |
| GB | 2261809 | * | 6/1993 |
| JP | 03227756 | * | 10/1991 |
| JP | 05147499 | * | 6/1993 |
| JP | 06247254 | * | 9/1994 |

* cited by examiner

*Primary Examiner* — David Dunn
*Assistant Examiner* — Philip Gabler
(74) *Attorney, Agent, or Firm* — Foley & Lardner LLP

(57) ABSTRACT

A seat belt stowage apparatus includes a seat with a backrest, a cavity, and a seat belt buckle. The cavity is located in the seat. The buckle is releasably attached to a seat belt tongue. The buckle is movable between a stowage position inside the cavity and an in-use position. When a force is applied to the seat belt buckle, a buckle strap allows the seat belt buckle to be rotated forward out of the seat. When the force is removed, a torsion spring reverts the seat belt buckle to the stowage position inside the cavity.

19 Claims, 10 Drawing Sheets

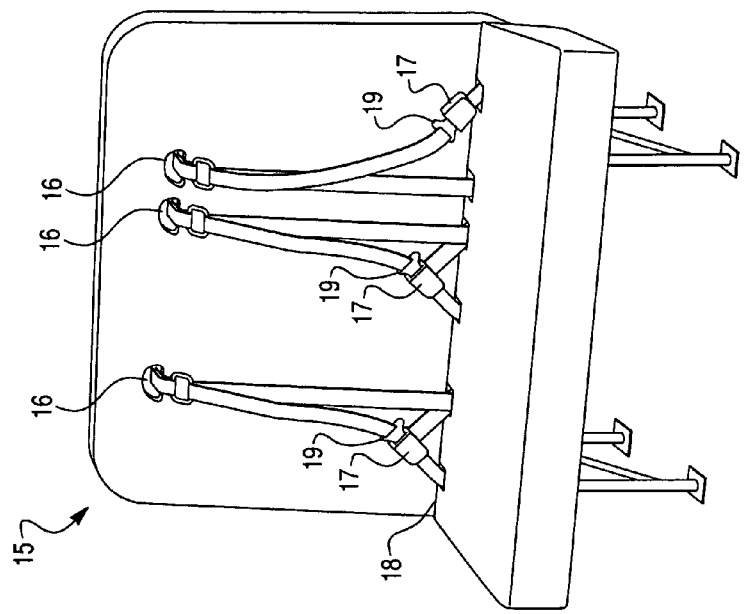
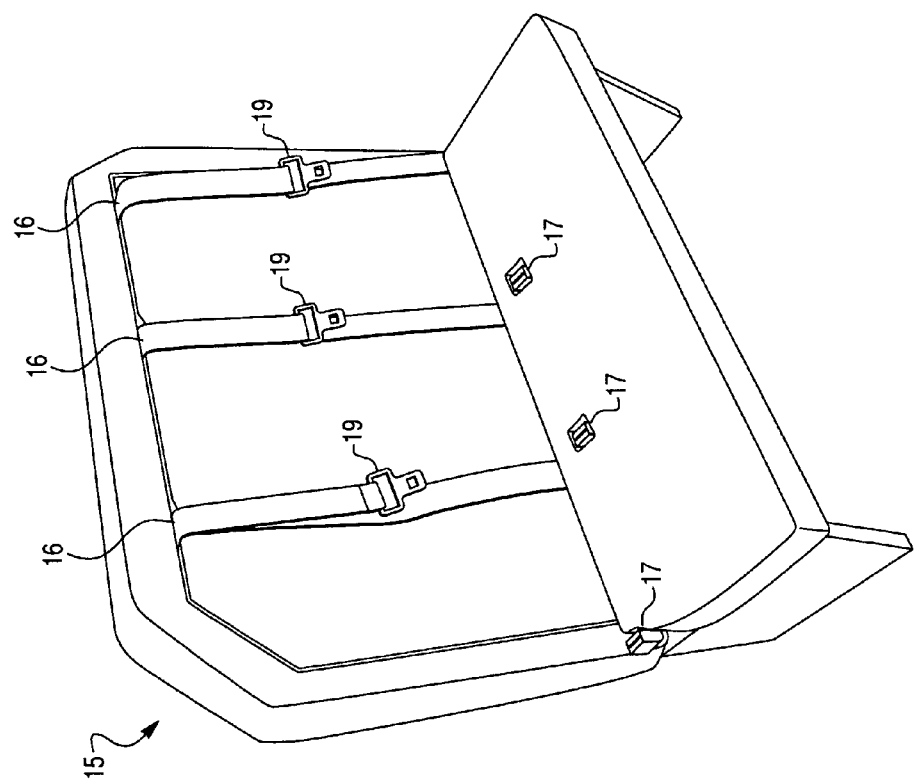

SEAT BELT SYSTEM AND SEAT

CROSS-REFERENCE TO RELATED PATENT APPLICATIONS

This application claims priority to U.S. Provisional Application No. 60/960,154, filed Sep. 18, 2007, which is incorporated herein by reference in its entirety.

BACKGROUND

Currently, webbing or strap-mounted seat belt buckles that do not include an automatic stowage function are available in buses, such as school buses. However, the presence of a buckle that does not have a stowage function may have inherent disadvantages.

Current construction and placement of seat belt buckles may cause the buckles to partially or fully recess into the seat bight line, recess into the seat cushion, or lay across the seat cushion. If the buckle must be accessed in a timely fashion, the location of the buckle may be obscured, and the buckle release button may become obscured or inaccessible. The buckle that is fixedly recessed in the seat cushion may also become obscured if a collision deforms the seat, making access to the buckle harder or even impossible. The buckle may also become "lost" by receding into the seat bight line. Similarly, the buckle may be obscured and may come into contact with another object, inadvertently becoming unlatched. The occupant may not be readily aware of a buckle unlatching because the buckle may be obscured from view of the occupant.

Also, the buckle may be exposed to contamination and incidental damage (i.e. food, drink, wear and tear, etc.) which may reduce the efficiency of the buckle or even prevent the buckle from functioning properly. Additionally, buckles that do not automatically retract into the seatback may be an obstruction when a passenger attempts to move to or from the seat. Clothing or other material may become snagged to the buckle inadvertently. Furthermore, exposed buckles may cause discomfort when passengers sit on top of the buckles.

SUMMARY

According to an exemplary embodiment, a seat belt stowage apparatus is provided. The seat belt stowage apparatus comprises a seat with a seat backrest, a cavity located in the seat of the vehicle, and a seat belt buckle configured to attach to a seat belt tongue. The seat belt buckle is moveable between a stowage position inside the cavity and an in-use position.

According to another exemplary embodiment, a seat belt buckle apparatus is provided. The seat belt buckle apparatus comprises a seat belt assembly that includes a seat belt tongue attached to a seat belt that is configured to attach to a seat of a vehicle, a cavity located in the seat of the vehicle, and a seat belt buckle configured to releasably latch to the seat belt tongue. The seat belt buckle includes a buckle release button configured to disconnect the buckle from the seat belt tongue. The buckle includes a buckle cover configured to cover at least a portion of the inner structure of the buckle. The seat belt buckle apparatus also comprises a torsion spring configured to bias the buckle, a buckle strap configured to couple the buckle cover to the torsion spring, and a bracket configured to couple the buckle strap to the seat of the vehicle.

According to yet another exemplary embodiment, a seat apparatus for a vehicle is provided. The seat apparatus comprises a seat including a seat backrest and a seat bottom, and at least one seat belt assembly configured to attach to the seat. The seat belt assembly includes a seat belt tongue attached to a seat belt. The seat apparatus also comprises at least one seat belt buckle configured to releasably latch to the seat belt tongue. Each seat belt buckle includes a buckle release button configured to disconnect the buckle from the seat belt tongue. Each seat belt buckle includes a buckle cover configured to cover at least a portion of the inner structure of the buckle. The seat apparatus further comprises at least one cavity located in the seat backrest, at least one torsion spring configured to bias the buckle, and at least one buckle strap configured to couple the buckle cover and the torsion spring.

It is to be understood that both the foregoing general description and the following detailed description are merely exemplary of the invention, and are intended to provide an overview or framework for understanding the nature and character of the invention as it is claimed.

BRIEF DESCRIPTION OF THE DRAWINGS

The accompanying drawings are included to provide a further understanding of the invention, and are incorporated in and constitute a part of this specification. The drawings illustrate various embodiments of the invention, and together with the description serve to explain the principles and operation of the invention.

FIG. 2 is a view of a seat with buckles recessed into a seat cushion, according to prior art.

FIG. 3 is a view of a seat with webbing-mounted seat belt buckles that lie on the seat cushion when not in use, according to prior art.

FIG. 6(*b*) is a view of two spring-loaded seat belt buckles, including the symmetrical mounting bracket, according to an exemplary embodiment.

DETAILED DESCRIPTION

Figure 1:
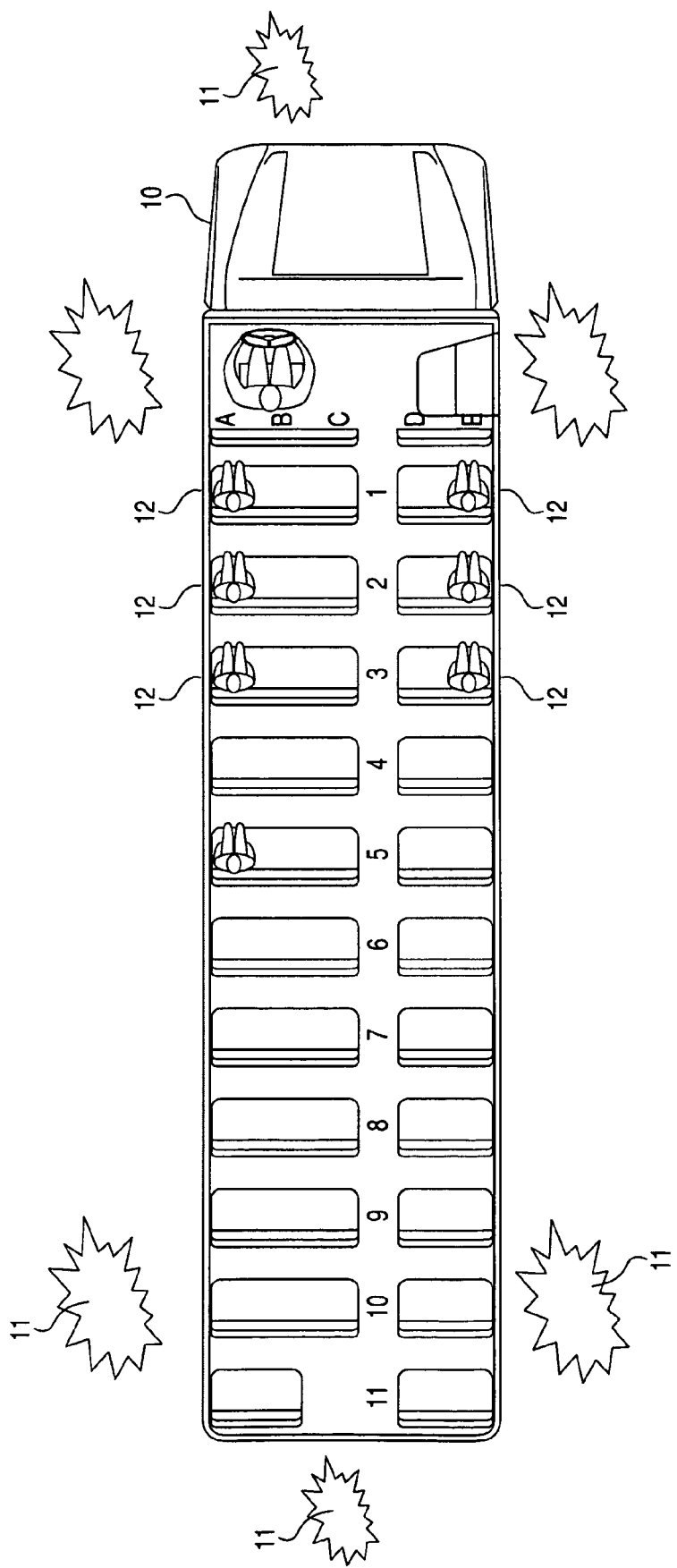
FIG. 1 is a top view of a bus with potential collision zone and occupant locations shown, according to an exemplary embodiment.

FIG. 1 is a top view of a bus 10, according to an exemplary embodiment. In this particular illustration, the bus 10 may be a "Type C" bus. According to other exemplary embodiments, the bus 10 may be any other kind of school, commercial, or motor-coach bus, or other motor vehicle. Potential collision zones are illustrated by a plurality of zones 11. A collision may impact all or parts of the zones 11 or could impact another part of the bus depending on the type of collision and the colliding object. In the event of a collision, the use of a seat belt may help reduce injuries to the occupants 12 of the vehicle. The occupants 12 may use a seat belt as a safety feature to limit the danger the occupants 12 may be put into during a collision event.

Referring to FIG. 2, a view of a current-production bus seat 15 with seat belts 16 is shown. Three seat belts 16 (including the seat belt tongues (tabs) 19) are shown and seat belt buckles 17 are shown as recessed buckles. A seat belt buckle 17 is available for each seat belt 16. The seat belt buckles 17 are shown embedded into the seat 15. The location of the buckle 17 may not be readily obvious to all passengers.

Referring to FIG. 3, a view of a current-production bus seat 15 with seat belts 16 is shown. Three seat belts 16 (including the seat belt tongues 19) are shown and the seat belt buckles 17 are shown as webbing-mounted buckles. The seat belts 16 are shown as being fastened to the corresponding seat belt buckle 17. The seat belt buckle 17 as shown is near the seat bight line 18. The seat belt buckle 17 may recede into the seat bight line 18. The seat bight line is the intersection between the front surface of the seat back and top surface of the seat cushion. Potential seating locations may be difficult to define given the location of the three seat belts 16 as shown and the potential for the seat belt buckles 17 to be "shifted" into another location.

Figure 4:
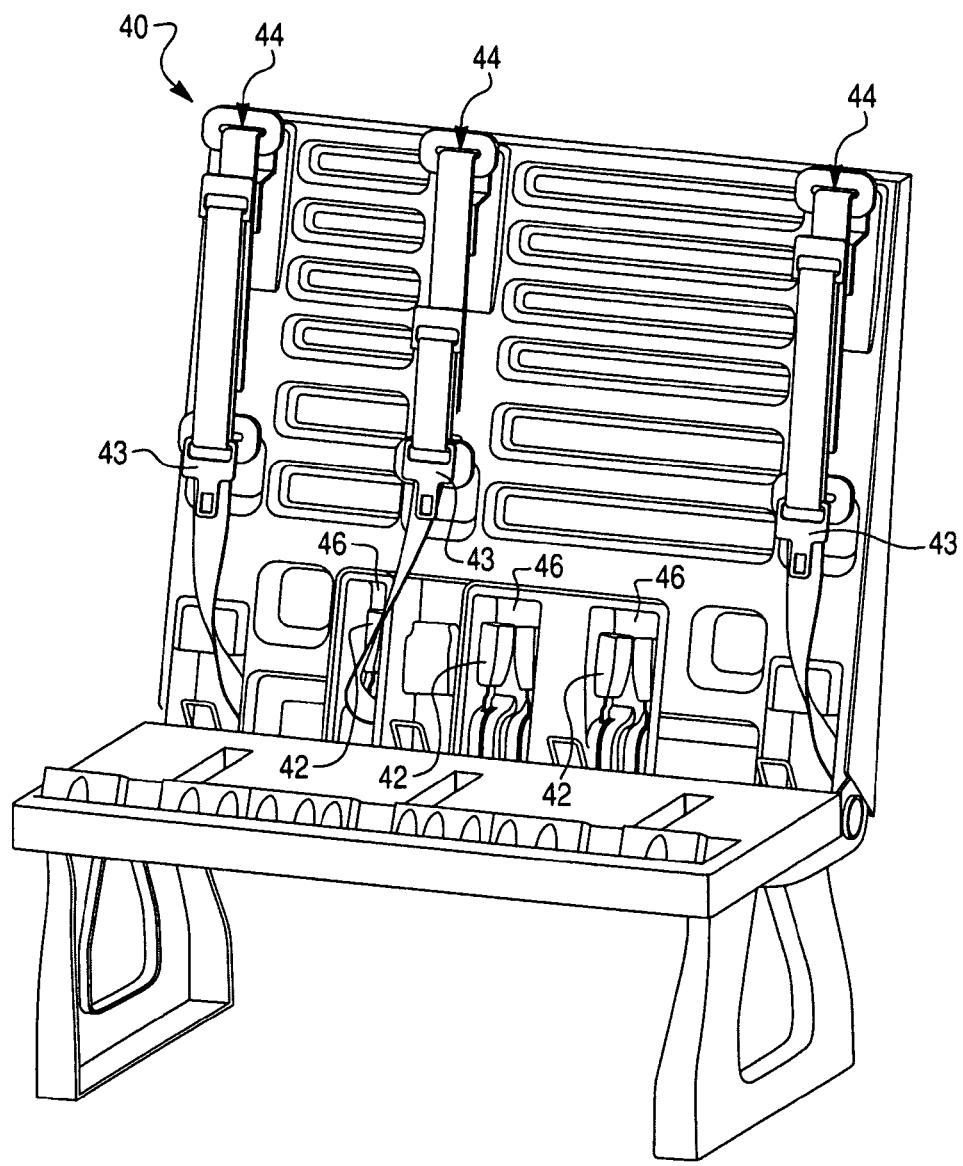
FIG. 4 is a view of a seat (shown without foam or trim) with a self-retracting seat belt buckle, according to an exemplary embodiment.

Referring to FIG. 4, a view of a bus seat 40 is shown without foam or trim assembled, according to an exemplary embodiment. Five seat belt buckles 42 are shown as being positioned upwards in a stowed position within a cavity 46 (sometimes referred to as a crevice, pocket, or notch) in the seat 40, which is different from the embodiments shown in FIGS. 2 and 3. The seat belt buckles 42 may rotate into place for occupant use. In FIG. 4, five seat belt buckles 42 are displayed along with three seat belt assemblies 44 (including the seat belt tongues 43). According to an exemplary embodiment, there may be more seat belt buckles 42 than seat belt assemblies 44 to allow for versatility in the seating arrangement of occupants.

The seat belt buckles 42 may rotate to various angles. For example, according to an exemplary embodiment, the buckles 42 may rotate from approximately −25 degrees from the vertical (perpendicular to the ground) when stowed to approximately 80 degrees forward of vertical when in use. The angle at which the buckle 42 is stowed may correspond with the angle of the backrest of the seat 40, as the buckle 42 may line up with or be parallel to the backrest. The angle at which the buckle 42 is stowed may also be more slanted than or less slanted than the slant of the backrest so that the buckle is not parallel to the backrest. The angle of the buckle 42 during use may vary based on the size of the occupant utilizing the buckle 42. If a collision occurs that comprises or deforms the back of the seat 40, the seat belt buckle 42 in use will be at an angle such that the buckle 42 is not obscured after the collision. The occupant can then easily find the buckle 42 and detach the seat belt 44 from the buckle 42.

As mentioned above, the buckle 42 may be designed to latch into place with a seat belt tongue 43 when used by an occupant. Latching could be used to secure an occupant into the seat, but this latching feature is not required for the buckle to function.

According to another exemplary embodiment, the buckle 42 may be rotated at any time by the occupant; but may be designed to stay in place when a force is not exerted on the buckle 42 by the occupant. Since the buckle 42 may be designed to stay in place without the occupant holding onto the buckle 42, the buckle 42 may be easier to locate in situations (e.g., an emergency) when the buckle 42 must be located by the occupant to release the seat belt 44. Also, accidental pressing of the buckle release button 60 may be prevented as a result of the buckle 42 being positioned above and/or away from the seat surface. For example, if the buckle 42 were to recede into the seat bight line, the cramped space between the deformed seat backrest and the seat cushion may inadvertently apply pressure on the buckle release button 60 and may cause the buckle release button 60 to depress and unlatch the seat belt tongue 43. According to another exemplary embodiment, the stowage of the buckle 42 into the cavity 46 may also make the buckle 42 easier to locate and make the accidental pressing of the buckle release button 60 unlikely to occur.

Figure 5:
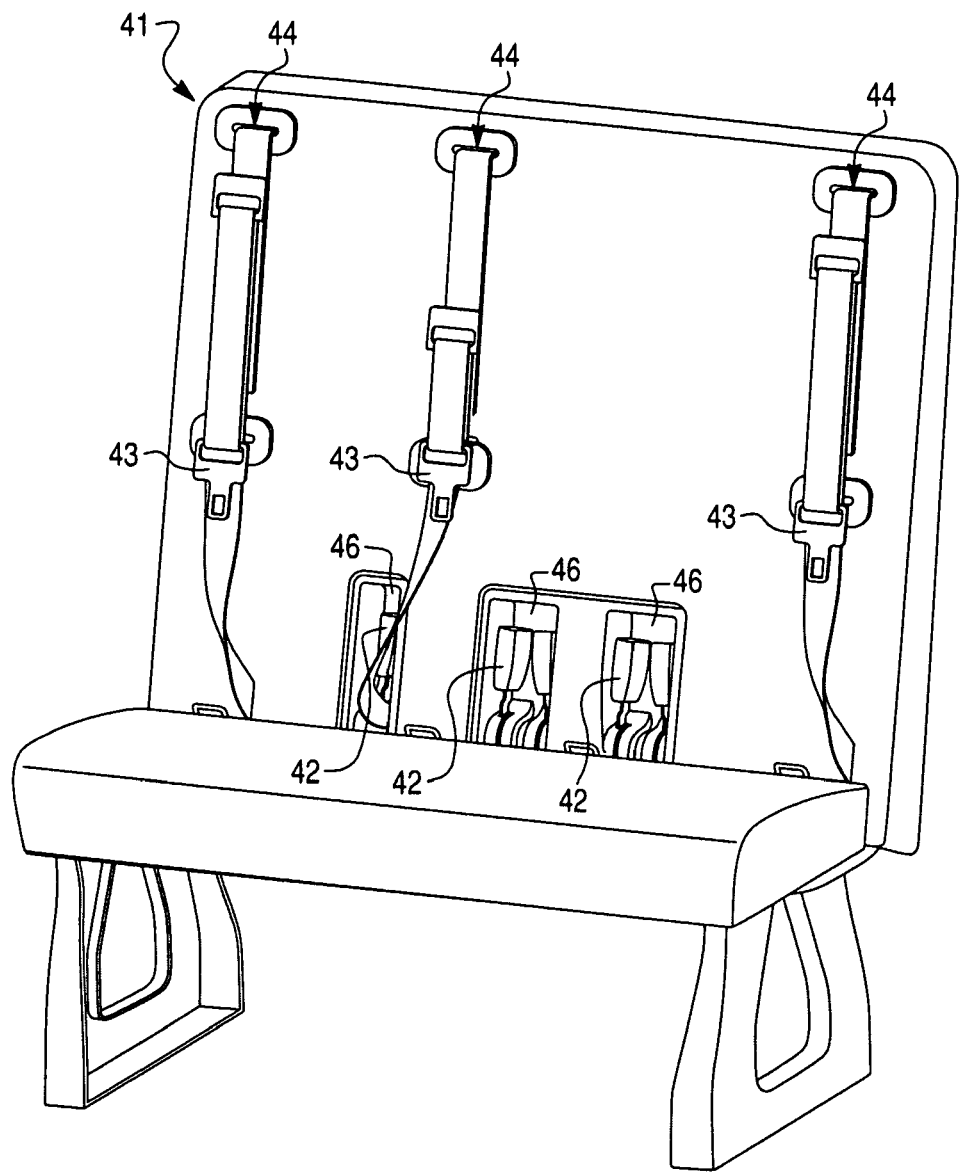
FIG. 5 is a view of a seat with the seat belt buckle in a stowed position, according to an exemplary embodiment.

Referring to FIG. 5, a view of a seat 41 with five seat belt buckles 42 in the stowage position and three seat belt assemblies 44 (including the seat belt tongues 43) are shown, according to an exemplary embodiment. The buckles 42 may be stowed in a cavity 46 in the seat 41, according to an exemplary embodiment. The seat 41 may be designed specially to allow stowage of a buckle 42. The cavity 46, in which the buckle 42 may be stowed, may be designed to allow easy access to the buckle 42. According to an exemplary embodiment, an occupant of the vehicle may be able to easily reach into the cavity 46 and rotate the buckle 42 without difficulty, even, for example, while wearing gloves.

The existence of the cavity 46 for the buckle 42 may lead to other advantages according to exemplary embodiments. For example, contamination and damage protection is provided to the buckle 42 by the cavity 46. When the buckle 42 is not in use, the buckle 42 may be stowed away such that no object may come into contact with the top of the buckle 42. Liquids or small objects may be prevented from falling inside the buckle 42, which may preserve the functionality of the buckle 42.

As another example, the existence of a cavity 46 for the buckle 42 may help ingress and egress efficiency. For example, if an emergency required the egress of a bus, the buckles 42 may automatically move to the stowage position by action of the torsion spring 70 and therefore out of the way of all occupants. Similarly, a stowed buckle 42 may improve access into and out of the seat 41.

In yet another example, the existence of a cavity 46 for the buckle 42 may improve comfort and usability of the buckle 42. When the buckle 42 is not in use, a torsion spring 70 (see FIGS. 6(a), 6(b), and 7) may rotate the buckle 42 into the cavity 46 of the seat 41. Comfort of the occupants of the seat may improve with the buckles 42 receded into the cavity 46 of the seat 41. Also, with the buckle 42 in the cavity 46 of the seat 41, the potential to "lose" the buckle 42 into the seat bight line is eliminated.

Figure 6A:
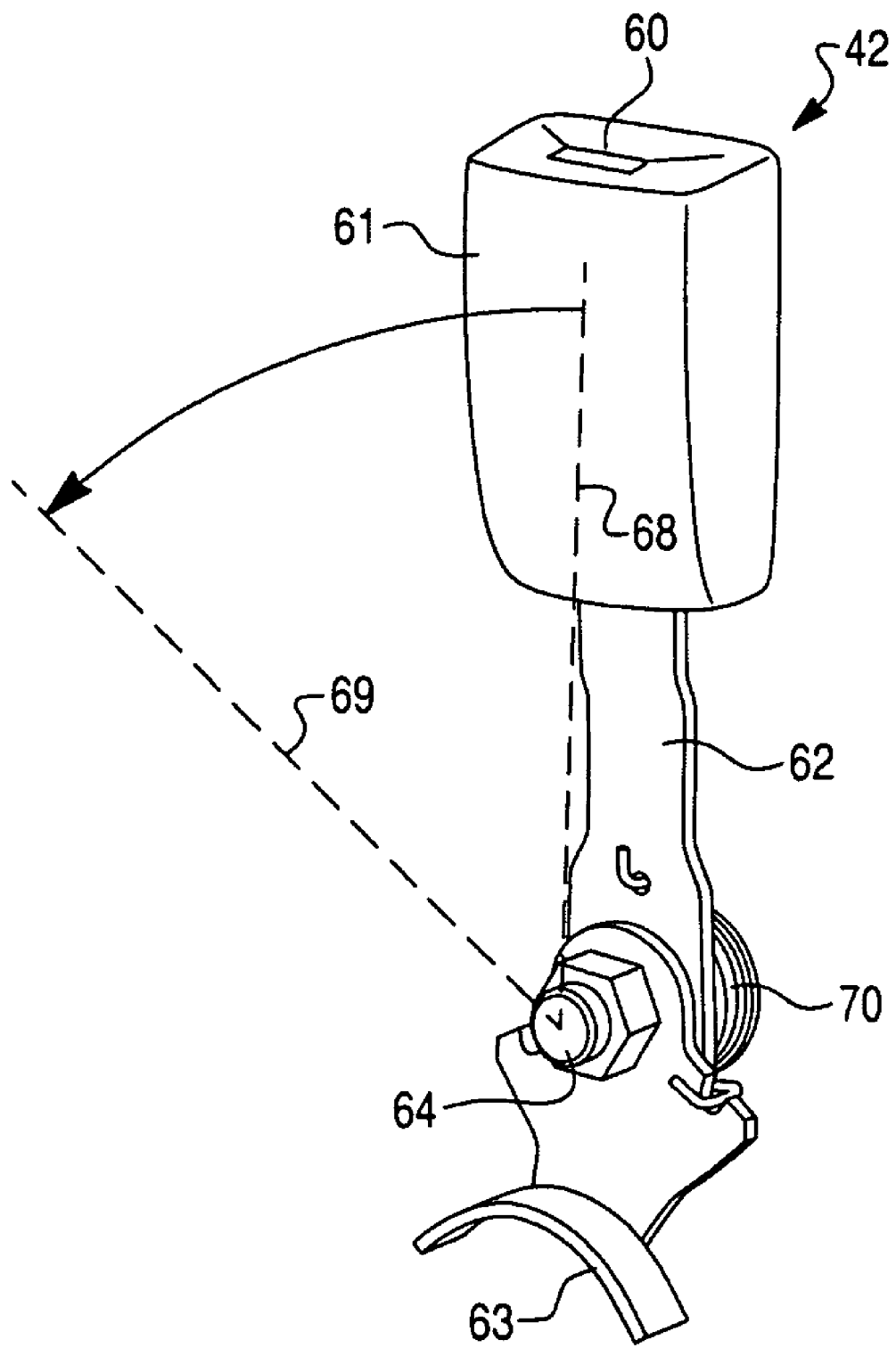
FIG. 6(*a*) is a view of a spring-loaded seat belt buckle, including the mounting bracket, according to an exemplary embodiment.
Figure 6B:
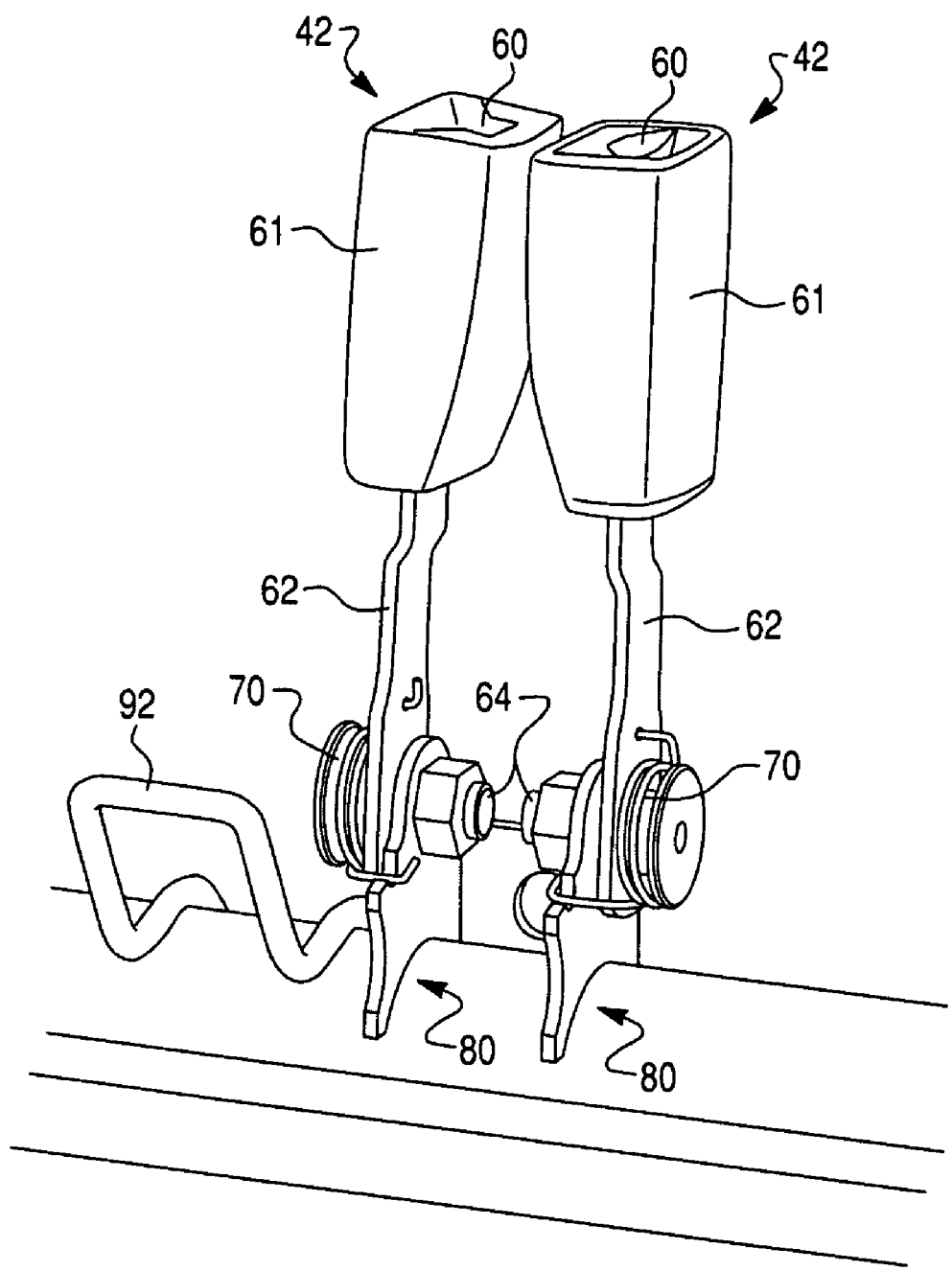

Referring to FIG. 6(a), a view of a seat belt buckle 42 is shown, according to an exemplary embodiment. The buckle release button 60 is used to disconnect the buckle 42 from the seat belt tongue 43 that is inserted in the buckle 42 to secure the seat belt assembly 44 in place (see FIG. 5). The cover 61 for the buckle 42 may protect the inner structure (e.g. latching mechanisms) of the buckle 42 from contamination and/or interference, although materials may still contaminate and/or interfere with the opening near release button 60. The structure, assembly, and properties of the upper part of the buckle 42 as shown in FIGS. 6(a) and 6(b) and its various embodiments should be apparent to those skilled in the art.

According to an exemplary embodiment, a buckle strap 62 may be coupled to the cover 61 and/or the inner structure of the buckle 42. The buckle strap 62 may be made of metal or any other sturdy material that is compliant to applicable safety standards. The buckle strap 62 is secured to a bracket 63 using, in the preferred embodiment, a screw and/or nut 64, allowing the buckle strap 62 to be rotated. According to other exemplary embodiments, the buckle strap 62 may be secured to the bracket 63 in various ways that allow the buckle strap 62 to be rotated (e.g., a riveted/formed pin inserted into a hole in the buckle strap 62 and the bracket 63).

According to an exemplary embodiment, the buckle strap 62 may also be coupled to a torsion spring 70, which may control the positioning of the buckle strap. The torsion spring 70 may be used to retract the buckle 42 when the buckle 42 is not in use. For example, when a buckle 42 is disconnected from its associated seat belt tongue, the torsion spring 70 may automatically retract the buckle 42 into a cavity 46 (see FIG. 5) in the seat without any occupant interaction. The automatic retraction may allow for further convenience, allowing the occupant not to worry about placing the buckle 42 into a stowage position, especially during an emergency when timely egress of the bus is required.

The bracket 63 may be coupled to a sturdy object within the seat or the seat frame, according to an exemplary embodiment. The bracket 63 may be coupled to another metal object within the seat by welding. Alternatively, coupling can be achieved by bolting, riveting, or peening the bracket 63 to a sturdy object in the seat structure or the seat frame, or may be coupled by another method. The bracket 63 may be of a different shape and/or material than the buckle strap 62 (see FIG. 8). The screw and/or nut 64 may be used to hold the buckle 42 in place and also to couple a torsion spring 70 to the buckle 42 (see FIG. 7).

The buckle 42 is shown in an upright or stowed position, approximately parallel to the vertical. The dotted line 68 illustrates a general path with which the buckle 42 may line up in a stowed position. The dotted line 69 represents a general area that the buckle 42 may be in during use. The arrow illustrates the general path the buckle 42 may take to transition from a stowed position to a deployed ("in-use") position. According to an exemplary embodiment, the angle that the two dotted lines form, which represents the maximum angle at which the buckle 42 may be deployed to, is 80 degrees. According to other exemplary embodiments, the angle may be more or less than 80 degrees and may be controlled by the occupant using the buckle 42.

Referring to FIG. 6(*b*), a view of two seat belt buckles 42 are shown, according to an exemplary embodiment. The buckle straps 62 may be secured to a symmetrical bracket 80 using a bolt 64.

Figure 7:
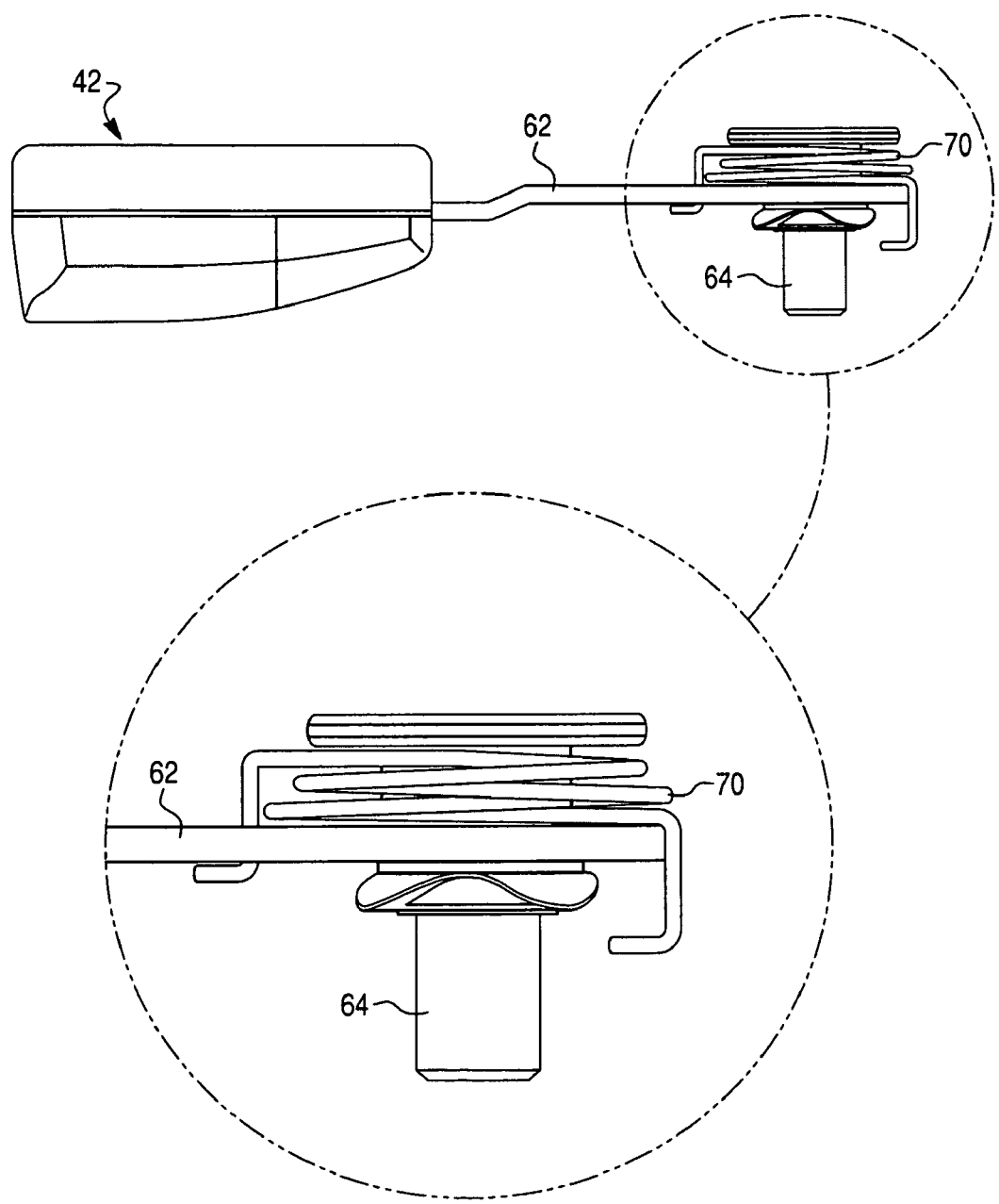
FIG. 7 is a detail view of a torsion spring of the spring-loaded seat belt buckle, according to an exemplary embodiment.

Referring to FIG. 7, a view of the torsion spring 70 is shown, according to an exemplary embodiment. The torsion spring 70 may be coupled to the bracket 63 (shown in FIG. 6(*a*)) using nuts, bolts, screws, pins, and/or other coupling mechanism. The torsion spring 70 is also coupled to the buckle strap 62 and uses the buckle strap 62 to influence the position of the buckle 42 at any given time by retracting the buckle 42 into the cavity 46 in the seat 41 (see FIG. 5). This retraction process may be performed automatically when a buckle 42 is disconnected from its associated seat belt tongue 43 (see FIG. 5). According to other exemplary embodiments, another mechanism, such as an elastomeric bushing, may be used to perform the actions of the torsion spring 70. According to yet other exemplary embodiments, the buckle 42 may be designed to lock into position whenever in use and may not use a torsion spring 70 to retreat into the stowage position when the buckle 42 is disconnected from its associated seat belt tongue 43.

Figure 8:
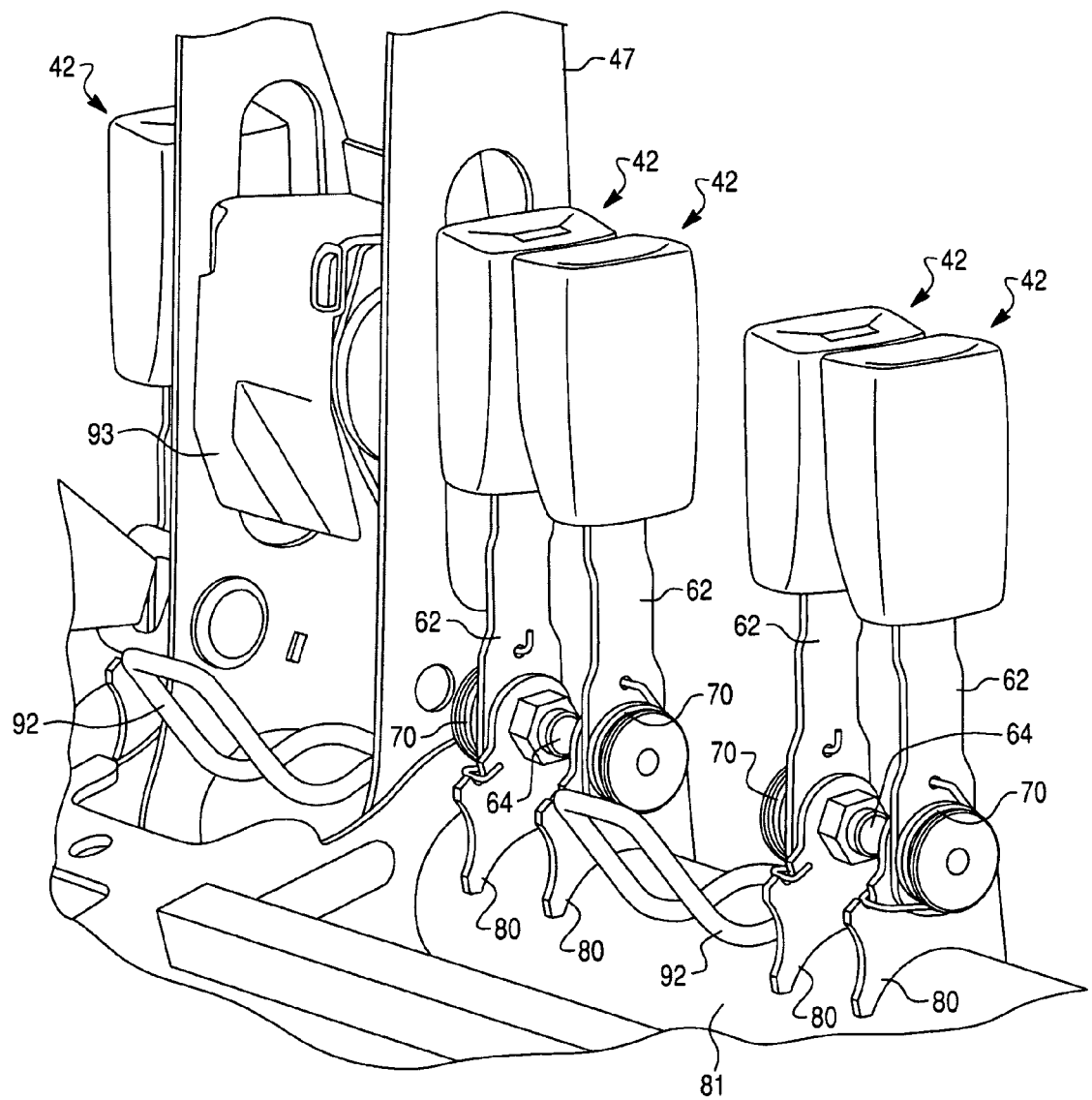
FIG. 8 is a view of spring-loaded seat belt buckles mounted using symmetrical brackets, according to an exemplary embodiment.

Referring to FIG. 8, five seat belt buckles 42 are shown mounted to symmetrical brackets 80, according to an exemplary embodiment. The use of symmetrical brackets 80 may be optional. The use of the brackets as shown in FIG. 6(*a*) may be sufficient for securing the seat belt buckles 42 for use. Alternatively, brackets may not be necessary to fasten the seat belt buckles 42 for use and, instead, the buckles 42 may be secured in another fashion to the seat, such as by bolting directly to a hole in the seat structure or frame.

The symmetrical brackets 80 may be of different shapes, according to various exemplary embodiments. As illustrated, the symmetrical brackets 80 may be "U-shaped" such that the symmetrical brackets 80 may fit naturally around a structural beam 81 (such as a rear cross member of a seat frame) such that two buckles 42 may be affixed to each symmetrical bracket 80. The symmetrical brackets 80 may be fastened to a structural beam 81 or another sturdy object within the seat or the seat frame. The symmetrical brackets 80 may be fastened in various ways (e.g., bolting, welding, etc.).

The symmetrical brackets 80 may provide the same functionality as a "normal" bracket 63 (shown in FIG. 6(*a*)), but may offer advantages in the construction of the bus seat. Traditionally, a "left handed" buckle (e.g., a buckle designed to be accessed on the left side of an occupant's body) and a "right handed" buckle (e.g., a buckle designed to be accessed on the right side of an occupant's body) are both used in a vehicle. One advantage of using the symmetrical brackets 80 is the ability to place "right handed" and "left handed" buckles on the same symmetrical bracket 80 instead of using installing separate "normal" brackets 63 for each "left handed" or "right handed" buckle. This feature may reduce production costs and provide design flexibility.

FIG. 8 also illustrates child seat anchorage brackets 92 and a seat belt retractor 93, which are shown for exemplary purposes only. A portion of the seat frame 47 is also shown in FIG. 8.

Figure 9:
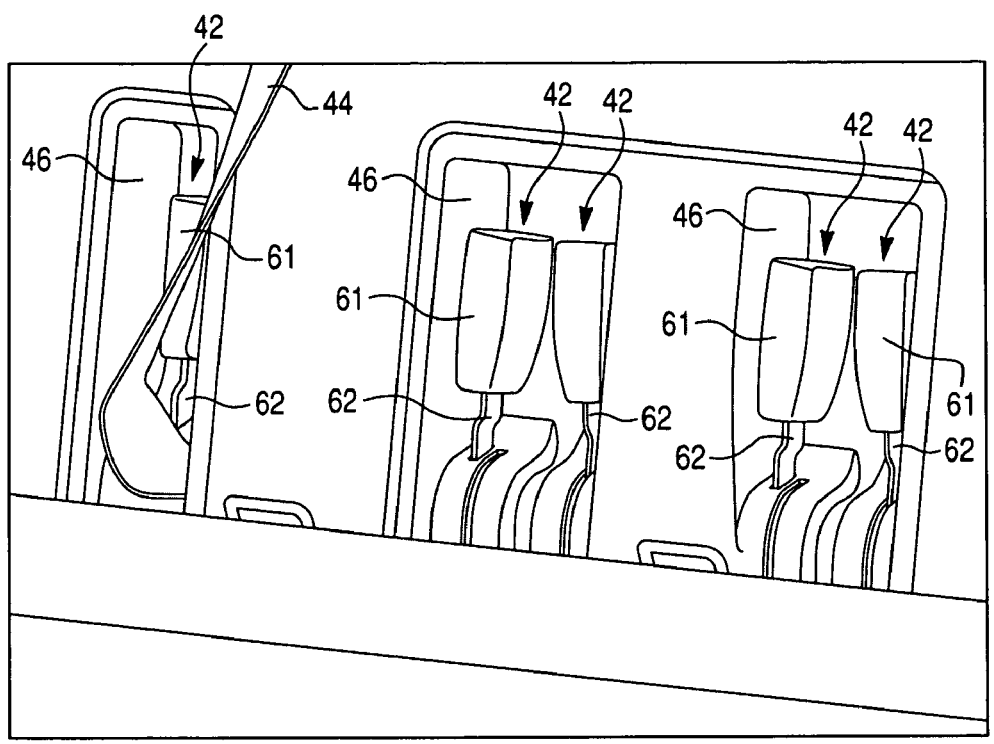
FIG. 9 is a detail view of spring-loaded seat belt buckles retracted into their respective cavities in a finished, assembled seat, according to an exemplary embodiment.

Referring to FIG. 9, five seat belt buckles 42 are shown stowed inside cavities 46, according to an exemplary embodiment.

To prevent the buckle 42 from receding into the cavity 46, the buckle 42 may be locked into place and may only be "unlocked" and receded into the cavity 46 of the seat when the buckle 42 is not fastened to the corresponding seat belt 44, according to an exemplary embodiment.

Figure 10:
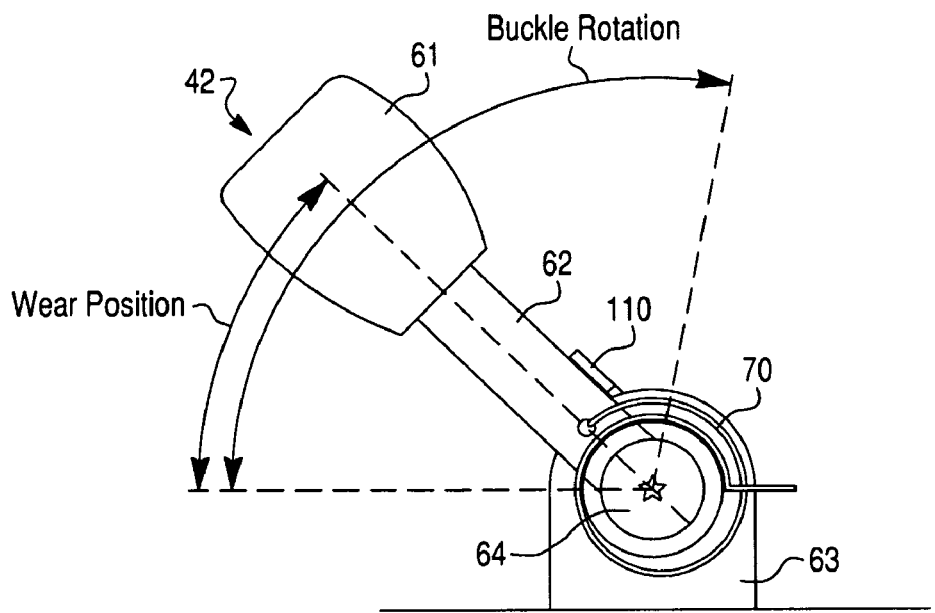
FIG. 10 is a view of a spring-loaded seat belt buckle, including a locking clip, according to an exemplary embodiment.
Figure 11:
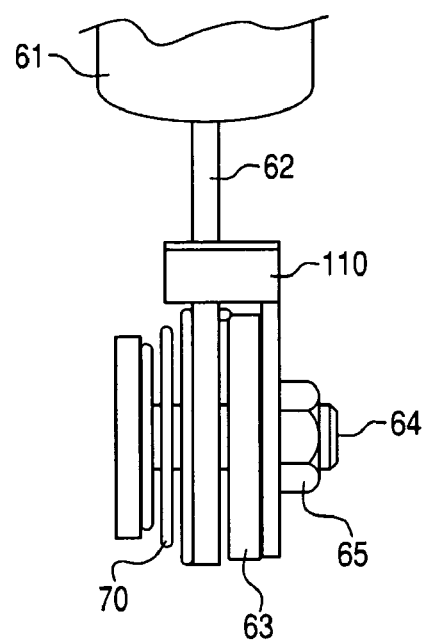
FIG. 11 is a view of the locking clip and torsion spring of FIG. 10.

FIGS. 10 and 11 illustrate a buckle 42 with a locking mechanism according to yet another embodiment. The locking mechanism includes a locking clip 110 coupled to the buckle 42 via a buckle strap 62. The buckle 42 also includes a torsion spring 70. The buckle 42 is coupled to a buckle mounting bracket 63 via a buckle attachment, such as a bolt 64 and a weld nut 65.

The locking clip 110 can be formed of spring steel, a stiff, flexibly polymer (such as nylon), or any other suitable material. The locking clip 110 is configured to counteract the retraction force of the torsion spring 70. The torsion spring 70 is biased to rotate the buckle 42 into a near vertical "stowage" position.

The locking clip 110 is configured to deflect out of the way when an occupant pulls the buckle 42 out of the corresponding cavity 46 and into the "in-use" or "wear" position. When the buckle strap 62 fully passes the deflected locking clip 110, the locking clip 110 will snap back into its original position. The buckle strap 62 will have sufficient stiffness to hold (lock) the buckle 42 in its "in-use" (wear position) until a nominal force is applied to the buckle 42 by the occupant, thereby deflecting the locking clip 110 out of the way so that the buckle 42 can fully return to the "stowage position." The buckle 42 will then be held (locked) in the stowage position until an occupant pulls on the buckle 42 and deflects the locking clip 110.

It is important to note that the construction and arrangement of the spring-loaded buckle as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. A seat belt stowage apparatus comprising:
a seat with a seat backrest;
a cavity located in the seat;
a seat belt buckle configured to attach to a seat belt tongue, wherein the seat belt buckle is moveable between a stowage position inside the cavity and an in-use position; and
a locking clip configured to lock the buckle into the in-use position;
wherein the locking clip is configured to deflect out of the way when the buckle is moved from the stowage position to the in-use position and then return to an original position when the buckle is moved back to the stowage position.

2. The seat belt stowage apparatus of claim 1, wherein the buckle is biased in the stowage position inside the cavity when no external force is applied to the seat belt buckle.

3. The seat belt stowage apparatus of claim 1, wherein the cavity is located in the seat backrest.

4. A seat belt buckle apparatus comprising:
a seat belt assembly configured to attach to a seat of a vehicle, wherein the seat belt assembly includes a seat belt tongue attached to a seat belt;
a cavity located in the seat of the vehicle;
a seat belt buckle configured to releasably latch to the seat belt tongue, wherein the seat belt buckle includes a buckle release button configured to disconnect the buckle from the seat belt tongue, and wherein the buckle includes a buckle cover configured to cover at least a portion of the inner structure of the buckle;
a torsion spring configured to bias the buckle;
a buckle strap configured to couple the buckle cover to the torsion spring;
a bracket configured to couple the buckle strap to the seat of the vehicle; and
a locking clip configured to lock the buckle into an in-use position;
wherein the locking clip is configured to deflect out of the way when the buckle is moved from the stowage position to the in-use position and then return to an original position when the buckle is moved back to the stowage position.

5. The seat belt buckle apparatus of claim 4, wherein the torsion spring is configured to remain stationary, biasing the buckle in a stowage position, when no force is applied to the seat belt buckle apparatus.

6. The seat belt buckle apparatus of claim 5, wherein the buckle strap is configured to permit the seat belt buckle to rotate forward out of the cavity when an external force is applied to the buckle.

7. The seat belt buckle apparatus of claim 6, wherein the buckle strap is configured to permit the seat belt buckle to rotate backward into the cavity when an external force is applied to the buckle.

8. The seat belt buckle apparatus of claim 6, wherein the torsion spring is configured to rotate the buckle backward into the cavity, reverting the buckle to the stowage position, when the external force is removed and after the locking clip is deflected.

9. The seat belt buckle apparatus of claim 8, wherein the torsion spring is configured to revert the seat belt buckle to the stowage position.

10. The seat belt buckle apparatus of claim 4, wherein the seat belt buckle can rotate forward out of the cavity to a maximum of 80 degrees from a vertical.

11. The seat belt buckle apparatus of claim 4, wherein the seat belt buckle can rotate backward into the cavity to a maximum of 25 degrees from a vertical.

12. The seat belt buckle apparatus of claim 4, wherein the locking clip is coupled to the buckle via the buckle strap.

13. The seat belt buckle apparatus of claim 4, wherein the torsion spring is configured to bias the buckle in a stowage position, and wherein the locking clip is configured to counteract a retraction force of the torsion spring.

14. A seat apparatus for a vehicle comprising:
a seat including a seat backrest and a seat bottom;
at least one seat belt assembly configured to attach to the seat, wherein the seat belt assembly includes a seat belt tongue attached to a seat belt;
at least one seat belt buckle configured to releasably latch to the seat belt tongue, wherein each seat belt buckle includes a buckle release button configured to disconnect the buckle from the seat belt tongue and wherein each seat belt buckle includes a buckle cover configured to cover at least a portion of the inner structure of the buckle;
at least one cavity located in the seat backrest;
at least one torsion spring configured to bias the buckle;
at least one buckle strap configured to couple the buckle cover and the torsion spring; and
a locking clip configured to lock the buckle into an in-use position;
wherein the locking clip is configured to deflect out of the way when the buckle is moved from the stowage position to the in-use position and then return to an original position when the buckle is moved back to the stowage position.

15. The seat apparatus of claim 14, wherein two or more seat belt buckles are stowed in one cavity.

16. The seat apparatus of claim 14, wherein the locking clip is coupled to the buckle via the buckle strap.

17. The seat apparatus of claim 14, wherein the torsion spring is configured to bias the buckle in a stowage position, and wherein the locking clip is configured to counteract a retraction force of the torsion spring.

18. The seat belt stowage apparatus of claim 1, wherein the locking clip is coupled to the buckle via a buckle strap.

19. The seat belt stowage apparatus of claim 1, further comprising a torsion spring to bias the buckle in the stowage position, and wherein the locking clip is configured to counteract a retraction force of the torsion spring.

* * * * *